US007981294B2

(12) United States Patent
Herold et al.

(10) Patent No.: US 7,981,294 B2
(45) Date of Patent: *Jul. 19, 2011

(54) METHOD FOR THE EXTRACTION OF COMPONENTS MADE FROM ORGANIC MATERIAL

(75) Inventors: Michael Manfred Herold, Berlin (DE); Martin Dostler, Henningsdorf (DE); Ralf Looser, Berlin (DE); Tilmann B. Walk, Berlin (DE); Achim Fegert, Berlin (DE); Martin Kluttig, Berlin (DE); Britta Lehmann, Berlin (DE); Silke Heidemann, Berlin (DE); Annette Hennig, Mahlow (DE); Joachim Kopka, Berlin (DE)

(73) Assignee: Metanomics GmbH and Co. KGaA (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/243,094

(22) Filed: Oct. 1, 2008

(65) Prior Publication Data

US 2009/0032462 A1 Feb. 5, 2009

Related U.S. Application Data

(63) Continuation of application No. 10/494,419, filed as application No. PCT/EP02/12551 on Nov. 11, 2002, now Pat. No. 7,431,841.

(30) Foreign Application Priority Data

Nov. 13, 2001 (DE) .................................. 101 55 517
Jan. 29, 2002 (DE) .................................. 102 03 551

(51) Int. Cl.
*B01D 11/00* (2006.01)
*B01D 11/04* (2006.01)

(52) U.S. Cl. ........ 210/634; 210/656; 210/749; 210/806; 436/63; 436/161; 436/178

(58) Field of Classification Search .................. 210/634, 210/635, 638, 639, 656, 749, 774, 806; 422/70, 422/101; 436/63, 86, 89, 161, 174, 178; 95/82; 435/4, 6, 30, 34, 39
See application file for complete search history.

(56) References Cited

U.S. PATENT DOCUMENTS

| 2,154,713 | A | | 4/1939 | van Wijk et al. |
| 3,153,054 | A | | 10/1964 | Brown |
| 3,153,055 | A | * | 10/1964 | Smith et al. ............... 549/413 |
| 3,207,744 | A | | 9/1965 | O'Hara et al. |
| 3,243,451 | A | | 3/1966 | Ward |
| 3,579,539 | A | | 5/1971 | Bullard |
| 3,966,410 | A | * | 6/1976 | Jahnsen ............... 436/178 |
| 3,996,132 | A | | 12/1976 | Mateos et al. |
| 4,283,199 | A | | 8/1981 | Szabo |
| 4,429,049 | A | * | 1/1984 | Rogers et al. ............... 436/178 |
| 4,460,504 | A | | 7/1984 | Rubin et al. |
| 4,496,426 | A | | 1/1985 | Baumeister et al. |
| 5,562,755 | A | | 10/1996 | Fricke et al. |
| 5,843,311 | A | * | 12/1998 | Richter et al. ............... 210/634 |
| 6,071,410 | A | * | 6/2000 | Nau et al. ............... 210/635 |
| 6,395,178 | B1 | | 5/2002 | Hauck et al. |
| 6,790,669 | B1 | | 9/2004 | Pfeiffer et al. |
| 7,311,838 | B2 | * | 12/2007 | Herold et al. ............... 210/639 |
| 7,431,841 | B2 | * | 10/2008 | Herold et al. ............... 210/634 |
| 2004/0262221 | A1 | | 12/2004 | Herold et al. |
| 2007/0020662 | A1 | * | 1/2007 | Cima et al. ............... 435/6 |

FOREIGN PATENT DOCUMENTS

| DE | 43 43 625 C1 | 6/1995 |
| EP | 0 290 156 A2 | 11/1988 |
| WO | WO-01/04622 A1 | 1/2001 |

OTHER PUBLICATIONS

Katona, Z.F., et al., "Simultaneous Determination of Sugars, Sugar Alcohols, Acids and Amino Acids in Apricots by Gas Chromatography-Mass Spectrometry", Chromatography, vol. 847, (1999), pp. 91-102.
Trethewey, R.N., et al., "Commentary: Metabolic Profiling: a Rosetta Stone for Genomics?", Curr. Opin, Plant. Biol., vol. 2, (1999), pp. 83-85.
Sauter, H. et al., "Metabolic Profiling of Plants: A New Diagnostic Technique", ACS Symposium Series 1991, (Synth. Chem. Agrochem, II, American Chemical Society, Washington, D.C.), vol. 443, (1991), pp. 288-299.
Fiehn, O., at al., "Metabolite Profiling for Plant Functional Genomics", Nature Biotechnology, vol. 18, (2000), pp. 1157-1161.
Fiehn, O., et al,, "Identification of Uncommon Plant Metabolites Based on Calculation of Elemental Compositions Using Gas Chromatography and Quadrupole Mass Spectrometry", Anal. Chem., vol. 72, (2000), pp. 131-142.
Roessner, U., at al., "Simultaneous Analysis of Metabolites in Potato Tuber by Gas Chromatography-Mass Spectrometry", The Plant Journal, vol. 23, (2000), pp. 131-142.
Gilmour, S.J., at al., "Overexpress of the Arabidopsis *CBF3* Transcriptional Activator Mimics Multiple Biochemical Changes Associated with Cold Acclimation", Plant Physiology, vol. 124, (2000), pp. 1854-1865.
Strand, A., at al., "Acclimation of Arabidopsis Leaves Developing at Low Temperatures, Increasing Cytoplasmic Volume Accompanies Increased Activities of Enzymes in the Calvin Cycle and in the Sucrose-Biosynthesis Pathway", Plant Physiology, vol. 119, (1999), pp. 1387-1397.
Kellner, R., et al., "Liquid Chromatography", Analytical Chemistry, Weinheim, (1998), p. 195.

(Continued)

*Primary Examiner* — Joseph W Drodge
(74) *Attorney, Agent, or Firm* — Connolly Bove Lodge & Hutz LLP

(57) ABSTRACT

The present invention relates to a process for extracting constituents from organic material, comprising the step of extracting with a monophasic mixture of 50% by volume to 90% by volume of methanol and 50 to 10% by volume of water and optionally 0% by volume to 40% by volume of a further solvent or solvent mixture.

17 Claims, No Drawings

OTHER PUBLICATIONS

Bligh, E.G., et al., "A Rapid Method of Total Lipid Extraction and Purification", Can. J. Biochem. Physiol., vol. 37, (1959), pp. 911-917.

Bjorklund, E., et al., "Pressurized Liqud Extraction of Persistent Organic Pollutants in Environmental Analysis", Trends in Analytical Chemistry, vol. 19, No. 7, (2000), pp. 434-445.

Richter, B.E., et al., "An Accelerated Solvent Extraction System for the Rapid Preparation of Environmental Organic Compounds in Soil", American Lab, vol. 27, (1995), pp. 24-28.

Ezzell, J.L., et al., "A Comparison of Accelerated Solvent Extraction with Conventional Solvent Extraction for Organophosphorus Pesticides and Herbicides", LC-GC, vol. 13, No. 5, (1995), pp. 390-398.

"Biomedical Pathways: An Atlas of Biochemistry and Molecular Biology", ed. Gerhard Michal, John Wiley & Sons, Inc., NY, NY, (1999), (inside cover pages with Table of Contents).

"RöLexikon Biotechnologie", eds. Prof. Dr. Hanswerner Dellweg, Prof. Dr. Rolf D. Schmid and Prof. Dr. Wolfgang E. Tommer, Teorg Thieme Verlag Stuttgart, (1992), (inside cover pages and pp. 4-5).

"Experiments and Gene Fusions", eds. Thomas J. Silhavy, Michael L. Berman and Lynn W. Enquist, Cold Spring Harbor Laboratory Press, (1984), (inside cover pages with Table of Contents).

Kyoto Encyclopedia of Genes and Genomes, Institute of Chemical Res. at Kyoto University, Japan, (1995), pp. 359-360.

* cited by examiner

METHOD FOR THE EXTRACTION OF COMPONENTS MADE FROM ORGANIC MATERIAL

RELATED APPLICATIONS

This application is a continuation of U.S. application Ser. No. 10/494,419, filed May 5, 2004, issued as U.S. Pat. No. 7,431,841, which is a 35 U.S.C. 371 National stage filing of International Application No. PCT/EP2002/12551, filed Nov. 11, 2002, which claims priority to German Application No. 10155517.2-43, filed Nov. 13, 2001 and German Application No. 10203551.2, filed Jan. 29, 2002. The entire contents of each of these applications are hereby incorporated by reference herein in their entirety.

FIELD OF INVENTION

The present invention relates to a process for extracting constituents from organic material, comprising the step extracting with a monophasic mixture of 50% by volume to 90% by volume of methanol and 50 to 10% by volume of water and, optionally, 0% by volume to 40% by volume of a further solvent or solvent mixture.

DESCRIPTION OF THE BACKGROUND

The understanding of the biochemical synthetic pathways in the metabolism of animal or plant cells, including microorganisms such as bacteria, fungi and algae, or mammalian cells, remains very rudimentary, even though the main synthetic pathways are known. To date, the determination of physiological states during growth, development or as a response to environmental stress is essentially limited to the study of individual target molecules such as, for example, RNA and proteins. However, changes in the mRNA or protein level or their activity can frequently not be correlated with changes in the metabolism or indeed with phenotypic functions.

Cellular constituents or metabolites are frequently analyzed directly either by specific enzymatic reactions, immunoassays or on the basis of chromatographic methods, which identify certain substances by their retention times or coelution with reference substances. As described in Katona, J. Chromatography 1999, 847, 91-102, most of the prior art only deals with the analysis of few, specific components, for example acids or sugars. Most of the known processes limit a comprehensive biochemical analysis by the following facts: (a) they are not open, i.e. it is only possible to obtain information on metabolites which are already known, (b) they are very labor-intensive since they are frequently based on individual assays; (c) their resolution is only very poor, and the result is therefore a profile which only has a very low degree of complexity and contains little information, (d) they only cover metabolites in a cell in only one status, for example a growth phase or under the effect of a stress factor, and dynamic changes in the cell can therefore not be monitored, or (e) they only cover few of the classes of substances present in the organism, for example only sugars or only fatty acids or only certain molecular weights, but not the broad range of polar or unpolar substances. There exist only first attempts to demonstrate that metabolites not only constitute intermediate or end products, but also act as sensors and regulators.

The comprehensive and quantitative determination of the metabolites and constituents present in an organic sample (independently of whether this determination is limited to various classes of substances, given developmental stages or types of material, i.e. independently of whether it takes the form of metabolic fingerprinting, metabolic profiling or metabolomics) enables the direct study of immediate effects of growth, development or stress on the entire organism or parts thereof and is thus helpful as essential part of functional genome analysis in the determination of gene functions. Processes for analyzing metabolic profiles, in particular when they are suitable for analyzing substantial numbers of samples, permit the study of the complexity of the regulatory interactions at all levels and all stages and, last but not least, the assessment of the safety and value of genetically modified organisms.

The most advanced aspect is the determination of complex metabolic profiles in diagnostic screens, but first profiles have also recently been described for plants (for a review see Trethewey, Curr. Opin. Plant. Biol. 1999, 2, 83-85). Thus, Sauter (ACS Symposium Series 1991, 443 (Synth. Chem. Agrochem. 2), American Chemical Society, Washington, D.C., 288-299) demonstrates the modification of constituents in barley following treatment with various herbicides. Sauter describes the weighing of frozen plant samples and extraction thereof with 100% ethanol as advantageous method. Following filtration, drying and silylation, the samples can be separated via capillary columns. Between 100 and 200 signals were detected and identified with the aid of reference substances via their retention coefficients in gas chromatography (GC) or via gas chromatography/mass spectrometry analysis (GC/MS).

Fiehn, Nature Biotechnology 2000, 18, 1157-1161 describes the quantification of 326 substances in *Arabidopsis thaliana* leaf extracts. To compare four different genotypes, frozen plant samples were homogenized in a complicated procedure, extracted with 97% methanol and brief heating, and, after addition of chloroform and water, a multi-step procedure gave a polar and an unpolar phase which were then analyzed by LC/MS and GC/MS (see also Fiehn, Anal. Chem. 2000, 72, 3573-3580; http://www.mpimp-golm.mpg.de/fiehn/blatt-protokoll-e.html). Following a very similar method, Roessner, The Plant Journal 2000, 23, 131-142, extracts plant constituents with methanol and compares the profiles of polar metabolites of in-vitro potato plants and potato plants grown in soil.

Gilmour, Plant Physiology 2000, 124, 1854-1865 extracts sugar from lyophilized *Arabidopsis* leaves in 80% ethanol following incubation for 15 minutes at 80° C. and incubation overnight at 4° C. Strand, Plant Physiology 1999, 119, 1387-1397 extracts soluble sugars and starch twice in succession, likewise at 80° C. and for 30 minutes and in 80% ethanol with Hepes, pH 7.5. The material is then reextracted twice at this high temperature to improve the result of the extraction, once with 50% ethanol/Hepes, pH 7.5, and once with Hepes, pH 7.5.

These methods described in the prior art only permit limited automation which, moreover, can only be realized in the form of a complex procedure. In particular the processing of large sample numbers, the determination of the effect of a variety of stress factors on the metabolism of the organisms or the observation of dynamic processes, which requires a continuous analysis of samples during windows which are often very short, require processes (a) which are rapid, i.e. for example that fixing and analysis of the samples is effected within a short period after sampling,
(b) which are highly reproducible, i.e. for example that an analysis carried out with a large number of different samples gives results within a very narrow error margin, (c) which are simple to handle, i.e. for example that the process can be automated and does not require complex or laborious procedures,
(d) which are open, i.e. for example that a large number of substances can be analyzed, and/or
(e) which are sensitive, i.e. for example that the analysis identifies even small changes in substance concentrations and small amounts of substance.

Many processes have the disadvantage that they are only suitable for the analysis of small sample numbers. With a larger number of samples, it is not possible to ensure sample stability, and thus the reproducibility of the results. A comprehensive continuous analysis of biological material, for example animal samples or plant samples, or for example the interaction between a substance, or substances, and organisms in complex systems and their course over time is thus not possible.

SUMMARY OF THE INVENTION

The present invention overcomes the problems and disadvantages associated with current strategies and designs and provides new processes for extraction constituents from organic material.

One embodiment of the invention is directed to processes for extracting constituents from organic material, comprising the steps of extracting with a monophasic mixture of 50% by volume to 90% by volume of methanol and 50% by volume to 10% by volume of water and, optionally, 0% by volume to 40% by volume of a further solvent or solvent mixture; and extracting with a monophasic, unpolar solvent or solvent mixture, wherein the combined extracts form one phase. Another embodiment of the invention is directed to constituents extracted by a process of the invention.

DETAILED DESCRIPTION OF THE INVENTION

It is an object of the present invention to find a process which permits overcoming the abovementioned shortcomings of the prior-art processes and which makes possible the rapid and simple analysis of, in particular a substantial number of, samples with a high degree of sensitivity and reproducibility.

We have found that this object is achieved by the embodiments characterized in the claims of the present invention.

Accordingly, the application relates to a process for extracting constituents from organic material, comprising the step (a) extracting with a monophasic mixture of 50% by volume to 90% by volume of methanol and 50% by volume to 10% by volume of water. In accordance with the invention, 0% by volume to 40% by volume of the mixture optionally consist of a further solvent or solvent mixture, the total mixture forming one phase. Further solvents or solvent mixtures are listed hereinbelow.

The term "organic material" refers to any organic or biological material, such as material of plants, animals, microorganisms, for example protists, fungi, bacteria, algae, viruses and the like, such as organisms separated from culture material, body fluids such as blood, lymph, secretions, or foodstuffs, feedstuffs and other animal or plant products. Likewise, it refers to culture material in which organisms live, i.e. for example also after the organisms have been removed, for example media for growing microorganisms such as protists, for example kinetoplasts, plasmodia or bacteria, for example Gram-positive or Gram-negative bacteria, or algae or fungae, for example yeasts, or animal or plant cells.

The term "extraction" or "to extract" as used in the present invention refers to the transfer of substances contained in a solid or liquid sample, for example constituents of organic material, into the respective solvent or solvent mixture using unpolar to polar solvents or solvent mixtures. The hydrophilic constituents, including, for example, metabolites, dissolve in a polar solvent, such as, for example, water, while the hydrophobic constituents, including, for example, metabolites, of the material are dissolved in a lipophilic solvent.

"Polar solvents or solvent mixtures" refers to a solvent or solvent mixture with a polarity index of from 4 to 10.2, preferably from 5 to 7, more preferably from 5.5 to 6.5, as described by Kellner, Analytical Chemistry, Weinheim, 1998, p. 195. Polar solvents are, for example, water including aqueous solutions, or polar aprotic or protic organic solvents, for example alkyl alcohols with an alkyl radical having 1 to 6 carbon atoms, for example methanol, ethanol, 1-propanol, 2-propanol, butanol, pentanol, hexanol or, for example, acetone, acetonitrile, ethyl acetate, dimethyl sulfoxide or N,N-dimethylformamide, or other solvents with a polarity greater than or equal to 0.50, as stated for example in Küster/Thiel, Rechentafeln für die Chemische Analytik [Nomograms for technical analysis], Walter de Gruyter, Berlin/N.Y. 1993, p. 359, or are mixtures of these. For example, a solvent mixture of 80% methanol/20% water used in accordance with the invention has the polarity index of 6.1 as defined by Kellner, 1998.

In the following text, "unpolar solvents or solvent mixtures" refers to solvents or solvent mixtures which have a polarity index as defined by Kellner, Analytical Chemistry, Weinheim, 1998, p. 195, which falls short of the polarity index of the extractant of the polar phase by 0.3 or more. More preferably, the polarity index as defined by Kellner, 1998, falls short of that of the extractant of the polar phase by 0.5, even more preferably by 1, most preferably by more than 2. Accordingly, the polarity index of the unpolar solvent is especially preferably 5.5 to 1, more preferably 5 to 2, most preferably 4.5 to 3.5 as defined by Kellner, 1998. Thus, for example, a solvent mixture of 40% methanol/60% dichloromethane employed in accordance with the invention has a polarity index of 3.9 as defined by Kellner, 1998. "Unpolar solvents" also include, for example, organic solvents, for example halogenated solvents such as chloroform, dichloromethane, carbon tetrachloride or aliphatic solvents such as hexane, cyclohexane, pentane, heptane and the like, or aromatic solvents such as, for example, toluene or benzene, or ethers such as for example, tert-butyl methyl ether, diethyl ether or tetrahydrofuran, or other solvents with a polarity of less than 0.50 as stated for example in Küster/Thiel 1993, or mixtures of these.

A "polar phase" or a "polar extract" refers to a phase or an extract which is obtained by extraction with a solvent or solvent mixture with a polarity index of from 4 to 10.2, preferably from 5 to 7, more preferably from 5.5 to 6.5 as defined by Kellner, Analytical Chemistry, Weinheim, 1998, p. 195, or which is obtained by extraction with a polar solvent or solvent mixture as stated above.

An "unpolar phase" or an "unpolar extract" refers to a phase or extract which has a lower polarity or a lower polarity index relative to the polar phase or the polar extract and with which substances of medium polarity to unpolar substances can be extracted better, such as, for example, in the case of extraction with unpolar solvents or solvent mixtures as stated above. In accordance with the invention, an "unpolar phase" or an "unpolar extract" is obtained by extraction with a solvent or solvent mixture with a polarity index as defined by Kellner, Analytical Chemistry, Weinheim, 1998, p. 195, which falls short of the polarity index of the solvent or solvent mixture of the polar phase or of the polar extract by 0.3 or more. More preferably, the polarity index falls short of the polarity index of the solvent or solvent mixture of the polar phase by 0.5, even more preferably by 1 most preferably by more than 2, as defined by Kellner, 1998.

The term "constituents" refers to polar and unpolar compounds, for example "metabolites", which originate from the catabolic or anabolic reactions of the metabolism or which are taken up by organisms from their environment. This relates to compounds which are localized cellularly or, in more complex organisms, also extracellularly, for example in body fluids. In the culture of microorganisms or other organisms, the constituents of these cultures, for example of the culture medium, are also encompassed. The concentration of a constituent is affected by external factors (environmental conditions, nutrient conditions, stress situation) or by internal conditions (development, regulations, changes owing to genetic influence) which the organisms are subjected to. The term refers both to what are known as primary metabolites and to secondary metabolites. "Primary metabolites" refers, as a rule, to those metabolites which are products of catabolic and anabolic pathways and which are of fundamental importance for the cell and thus more or less identical for all cells. "Secondary metabolites" refers, as a rule, to compounds which are formed predominantly in secondary pathways, for example in the case of stress situations, such as hunger or deficiency conditions, or after the active growth phase of the cell has ended and for which no discernible cellular function is known in many cases (see also Römpp Lexikon Biotechnologie, New York, 1992). Constituents are therefore understood as meaning for example polar and unpolar substances such as carbohydrates, amines (in particular amino acids), tetrapyrroles, lipids, steroids, nucleotides, nucleosides, cofactors, coenzymes, vitamins, antibiotics, hormones, peptides, terpenes, alkaloids, carotenoids, xanthophylls, flavoids and the like, and the substances of the respective metabolic pathways, without the above or the following enumeration in any form being considered as limiting.

Carbohydrates encompass for example the carbohydrates of the carbohydrate metabolism, for example glycolysis, gluconeogenesis, for example trioses, tetroses, pentoses, for example furanoses, or hexoses, for example pyranoses or heptoses, of the polysaccharide metabolism, of the pyruvate metabolism, of the acetyl coenzyme A metabolism, di- or oligosaccharides, glycosides, hexose derivatives, deoxy hexoses, carbohydrates of the pentose metabolism, of the amino sugar metabolism, of the tricarboxylic acid cycle of the glyoxylate metabolism and the like, or other substances of the respective metabolic pathways.

Amino acids encompass for example the amino acids of the amino acids metabolisms such as, for example, in the ammonia metabolism, or of the sulfur metabolism, the urea cycle, or their derivatives, for example aromatic or nonaromatic amino acids, polar uncharged, unpolar, aliphatic, aromatic, positively-charged, negatively-charged amino acids, branched-chain or straight-chain, essential or nonessential amino acids, or other substances of the respective metabolic pathways.

Tetrapyrroles encompass, for example, substances of the protoporphyrin metabolism, the haemoglobin metabolism, the myoglobin metabolism, the various cytochrome metabolisms, the photosynthetic metabolisms and the like, or other substances of the respective metabolic pathways.

Lipids encompass for example saturated or unsaturated, essential or nonessential fatty acids, acyl-CoA compounds, triacylglycerides, lipids of lipogenesis or lipolysis, phospholipids, for example glycerophospholipids, ether lipids, sphingophospholipids, glycolipids, or the substances of the respective metabolic pathways.

Hormones encompass steroids or nonsteroid hormones, for example peptide hormones or, for example, eicosanoids or octadecanoids.

Steroids encompass for example the substances of the cholesterol metabolism, hopanoids, plant steroids such as phyto- and mycosterols, insect hormones, isoprenoids, steroid hormones, gestagens, androgens, oestrogens, corticosteroids or the substances of the respective metabolic pathways.

Nucleotides and nucleosides encompass, for example, deoxyribonucleotides/nucleosides and ribonucleotides/nucleosides, their 5'-phosphate derivatives, purines, pyrimidines or their derivatives, for example cyclized, methylated and/or acetylated nucleoside or nucleotide derivatives and the like, or other substances of the respective metabolic pathways.

Likewise included are substances which play a role in these metabolic pathways. "Other substances of the respective metabolic pathways" refers to the respective intermediates in the biosynthesis, in the conversion, the transport or the metabolism of the substances mentioned. An overview of many metabolites can be found for example in Michal, Biochemical Pathways, Berlin, 1999 or in KEGG, Kyoto Encyclopedia of Genes and Genomes, Institute of Chemical Research at Kyoto University, Japan (z.B. http://www.genome.adjp/dbget/ligand.html), which are expressly incorporated herewith.

The term "water" refers to any type of aqueous solution, including, for example, deionized, demineralized, distilled or twice-distilled water. One or more substances which preferably improve the extraction, stability or solubility of the constituents of the organic material or which bring about preferred properties, for example pH value, conductivity, salt concentration and the like, may also be dissolved in the water or mixed therewith, as is the case, for example, in salt solutions or buffer solutions.

In the prior art, polar substances are, as a rule, extracted with pure alkyl alcohols such as ethanol (Sauter, 1991, Strand, 1999, Gilmour, 2000) or methanol (Fiehn, Anal. Chem. 2000 and Nature Biotechnology 2000, Roessner, 2000), alkyl alcohols which are mixed with water or buffer solutions, or with water or buffer solutions.

Water has very good extractive properties for polar substances. However, the fact that cellular processes, which, as a rule, have previously been stopped by freezing or freeze-drying, are reactivated in aqueous solutions is a disadvantage. This can bring about the enzymatic degradation or conversion of various metabolites and leads to a change in, and thus falsification of the concentrations or ratios within these extracts. As a rule, one attempts to prevent these undesired side reactions by working on ice. However, this has considerable disadvantages, both for the extraction efficacy and for working up large numbers of samples. Losses in sensitivity and a deviation of the actual cellular state at the point in time of harvesting are unavoidable.

Ethanol or methanol are used firstly because they have polar properties and thus extract hydrophilic constituents to a sufficient degree, and, secondly, since after their addition to a cell extract the activity of the cell extracts is inhibited owing to the toxic, denaturing effect of the alcohol. Thus, further reaction of the metabolites can no longer take place, and the cells are "frozen" at the metabolic stage of precisely this moment, However, the disadvantage is that some polar classes of metabolites are only sparingly soluble in methanol or ethanol. This leads to a loss in sensitivity and may also have an effect on the reproducibility of the results.

To overcome the disadvantages of an extraction with pure alcohol or pure water Strand, 1999 and Gilmour, 2000, amongst others, use ethanol/water mixtures for the extraction of sugars and incubate the starting material for 15 minutes or 30 minutes respectively, at 80° C. in this mixture. This is followed in each case by further complicated extraction steps in order to improve the insufficient extraction efficacy: Strand, 1999, establishes an extraction cascade of, thus, in total four high-temperature steps: first twice with 80% ethanol/20% Hepes, then 50% ethanol/50% Hepes and finally 100% Hepes, in each case 30 minutes at 80° C., while Gilmour, 2000, incubates overnight at 4° C. after the high-temperature step. An extraction in four steps, or additionally overnight after the high-temperature step, however, is very time consuming and labor-intensive. The attempt to compensate for the extraction properties of ethanol, which are poorer than those of water, by high temperatures and long extraction times can additionally lead to decomposition of the constituents and thus reduces the number of substances to be detected and the sensitivity of the system.

It has now been found that the monophasic mixture according to the invention of 50% by volume to 90% by volume of methanol and 10% by volume up to 50% by volume of water leads to a very good extraction yield. The process according to the invention leads to a higher yield than is the case with an extraction in pure methanol or ethanol. Moreover, the stability of the extract is increased over that of a pure extraction in water, and the reproducibility of the process is thus improved substantially. In contrast to the extraction with ethanol/water mixtures, the yield is sufficiently high for a single extraction step to suffice for isolating a very large number of constituents. In processes based on the extraction step according to the invention for isolating polar substances from plant cells, the number of analytes was only limited by the analytical method. A very high reproducibility was achieved.

The mixture preferably comprises at least 70% by volume of methanol, with at least 75% by volume being more preferred, 90% by volume likewise being preferred, 85% by volume being more preferred, and 80% by volume of methanol being most preferred.

Likewise preferred are 10% by volume to 50% by volume of water, with 15% by volume to 40% by volume of water being more preferred and 30% by volume of water being even more preferred. 20% by volume of water are most preferred. The process according to the invention is thus most preferably carried out with a mixture of 80% by volume of methanol and 20% by volume of water. If appropriate, the mixture may also comprise small amounts of another solvent or solvent mixture, for example dichloromethane, but less than 10% by volume are preferred and less than 5% by volume are more preferred; most preferably, no other solvent is present in the mixture.

This first extraction step for polar substances can be followed by one or more further extraction step(s) (a') with a solution with a higher water content or only with water or with a different alcohol, for example an alkyl alcohol with an alkyl radical having 1 to 6 carbon atoms, for example methanol, ethanol, 1-propanol, 2-propanol, butanol, pentanol, hexanol, or, for example, acetone or acetonitrile, if appropriate as a mixture with water or a mixture of different components. Methanol or a methanol/water mixture is most preferred. If appropriate, step (a) or (a') may be repeated once or more than once.

In an especially preferred embodiment, only a single extraction following step (a) is carried out.

Moreover, the process according to the invention may comprise step (b): extracting with a monophasic unpolar solvent or solvent mixture.

The solvent or solvent mixture in step (b) is more unpolar than the solvent or solvent mixture in step (a). According to the invention, the polarity index (as defined by Kellner, 1998) of the solvent or solvent mixture in step (b) falls short by 0.3 or more of that of the extractant of the polar phase in step (a). More preferably, the polarity index as defined by Kellner, 1998 falls short by 0.5, more preferably by 1, most preferably by more than 2, than that of the extractant of the polar phase. Preferably, the polarity index as defined by Kellner, 1998, of the solvent in (b) is from 5.5 to 1, more preferably 5 to 2, most preferably lower than 4.5 to 3.5. A solvent mixture employed in accordance with the invention of 40% methanol/60% dichloromethane thus, for example, has a polarity index of 3.9 as defined by Kellner, 1998.

Unpolar solvents or solvent mixtures have been described above, for example organic polar solvents or a mixture of one or more polar solvents such as, for example, alkyl alcohols having an alkyl radical with 1 to 6 carbon atoms, for example methanol, ethanol, 1-propanol, 2-propanol, butanol, pentanol, hexanol or, for example, acetone, acetonitrile, ethyl acetate, dimethyl sulfoxide or N,N-dimethylformamide, or other polar solvents with a polarity of greater than or equal to 0.5, for example as stated in Küster/Thiel 1993, and one or more unpolar organic solvents described above, for example halogenated solvents such as chloroform, dichloromethane, carbon tetrachloride, or aliphatic solvents such as hexane, cyclohexane, pentane, heptane and the like, or aromatic solvents such as, for example, toluene or benzene, or ethers such as, for example, tert-butyl methyl ether, diethyl ether or tetrahydrofuran, or other solvents with a polarity of less than 0.5 as stated in, for example, Küster/Thiel 1993.

A solvent component which is preferably employed in step (b) is one which is immiscible with water so that, upon a subsequent phase combination, phase separation into an unpolar phase and a polar phase can subsequently be brought about, However, the component is preferably miscible with methanol. A low boiling point, for example of 100° C. or less, more preferably 80° C., even more preferably 60° C. and most preferably 40° C. or less under atmospheric pressure is furthermore advantageous since removal of the solvent or solvent mixture can then be effected more rapidly and at lower temperatures under milder conditions for the constituents.

Halogenated solvents are preferred as solvents in step (b). Especially preferred as a mixture of methanol or ethanol and chloroform, pentane, hexane, heptane, cyclohexane, carbon tetrachloride or dichloromethane. A mixture of methanol or ethanol with chloroform or dichloromethane is more preferred. The mixture in step (b) is preferably composed of 30% by volume to 60% by volume of methanol or ethanol, a mixture with 40 to 50% by volume of methanol or ethanol being preferred. The use of methanol is most preferred. Preferably, the dichloromethane or chloroform amounts to 40 to 70% by volume, the use of dichloromethane being preferred. The remaining 0% by volume to 30% by volume can optionally be composed of a "further solvent or solvent mixture" which form one phase with the abovementioned mixture, for example ethanol or chloroform. It is preferred that no "further solvent or solvent mixture" is present.

If appropriate, the mixture in step (b) may also comprise small amounts of water, preferably 0% by volume to 20% by volume, with 10% by volume being more preferred, 5% by volume or less being even more preferred; no water in the mixture is most preferred.

In a preferred embodiment, the process according to the invention thus comprises the following step (b): extracting with a mixture of 30% by volume to 60% by volume of $C_1$- to $C_6$-alkyl alcohol, acetone, acetonitrile, ethyl acetate, dimethyl sulfoxide or N,N,-dimethylformamide and 40% by volume to 70% by volume of chloroform, dichloromethane, pentane, hexane, heptane, cyclohexane or carbon tetrachloride.

Surprisingly, it has been found that particularly good extraction is possible with a specific ratio of methanol and dichloromethane. Step (b) of the process according to the invention is therefore most preferably carried out with a mixture of 30 to 40% by volume of methanol and 60 to 70% by volume of dichloromethane. 40% by volume of methanol and 60% by volume of dichloromethane are most preferred.

If appropriate, step (b) can be repeated once or more than once and/or one or more further optional step(s) (b') with a higher content of aprotic solvent or pure aprotic solvent can follow.

In an especially preferred embodiment, step (b) is carried out only once.

The steps of the process according to the invention, in particular steps (a) and (b), can be carried out in parallel, for example the sample is first divided and the two extracts are then prepared separately, or in succession, for example when, after the $1^{st}$ extractant has been removed, the same sample is treated with a $2^{nd}$ extractant, with the sequence (a)(b) being just as possible as the sequence (b)(a), and intermediate steps also being possible. It is also possible to combine the steps with other steps. The sequence (a)(b) is most preferred.

Thus, the process according to the invention, which comprises steps (a) and (b) and, optionally, also steps (a') and (b'), allows the analysis of a large number of samples for polar and unpolar metabolites to be carried out in an automated fashion, rapidly and with a high degree of reproducibility.

In a further step, the extracts from step (a) and step (b) are, in the process according to the invention, combined post-extraction to give a phase mixture. Mixing of the two extracts results, as a rule, in the formation of one or two phases, for example a polar phase and an unpolar phase.

It is advantageous to treat the combined mixture of (a) and (b) with one or more analytical standards, for example internal standards and/or chromatographic standards. Examples of such standards can be compounds which do not occur in the natural samples, but which are similar to the substances analyzed, including isotope-labeled, radiolabeled or fluorescence-labeled substances, as in the case of sugars for example ribitol or alpha-methylglucopyranoside, in the case of amino acids for example L-glycine-2,2-$d_2$ or L-alanine-2,3,3,3-$d_4$, in the case of fatty acids or their derivatives in particular odd-numbered fatty acids or their methyl esters, for example methyl undecanoate, methyl tridecanoate or methyl nonacosanoate. The standards may also be added individually to the respective extract of step (a) or (b), independently of whether the extracts are combined or not.

In one embodiment, solvents or solvent mixtures which additionally comprise up to 5% by weight, more preferably up to 3% by weight and even more preferably up to 1% by weight, of buffer salts, acids and/or bases are used for extraction in the process according to the invention. Volatile buffer systems are preferred. Thus, substances which can be employed in accordance with the invention are, for example, ammonium formate solution, ammonium carbonate solution, ammonium chloride solution, ammonium acetate solution or ammonium hydrogen carbonate solution and/or an acid, for example formic acid, acetic acid, trifluoroacetic acid, pentafluoropropanoic acid, heptafluorobutanoic acid, nonafluoropentanioic acid, undecafluorohexanoic acid, tridecafluoroheptanoic acid or pentadecafluorooctanoic acid and/or a base such as, for example, triethylamine, pyridine or ammonia.

It is particularly advantageous when, in the extraction process according to the invention, the combined extracts form a phase to which standards can then preferably be added. The advantage of the repeated monophasic mixing of the two extracts prior to phase separation is that residues of polar substances from the unpolar extraction migrate into the polar phase and, vice versa, residues of unpolar compounds migrate from the polar phase into the corresponding unpolar phase.

Such a monophasic mixture is obtained, for example, when the extraction in step (a) is carried out with 80% by volume of methanol and 20% by volume of water and in step (b) with 40% by volume of methanol and 60% by volume of dichloromethane and the two extracts are then combined with each other. Thus, all of the constituents and, optionally for example the standards, are advantageously located in one phase.

The two phases can be separated by processes known to the skilled worker, see, for example, Bligh and Dyer, Can. J. Biochem. Physiol. 1959, 37, 9111-917, for example by addition of an unpolar, in particular an organic (for example dichloromethane), or a polar solvent or solvent mixture, in particular an aqueous solution, for example a buffer, or by addition of both an unpolar and a polar solvent or solvent mixture as have been described above. This gives rise to a phase comprising the polar constituents ("polar phase"/"polar extract") and a phase comprising the constituents of medium polarity to unpolar constituents ("unpolar phase"/"unpolar extract"). Phase separation is preferably achieved by addition of the solvents used for the extraction, in particular by addition of methanol, dichloromethane and/or water. After combining, the phases are separated again and can be derivatized and/or analyzed, depending on their further use.

Instead of, or after, a phase separation, fractionation into two or more fractions can also be carried out, in the process according to the invention, by means of solid-phase extraction. Fractionation into a plurality of fractions has the advantage that the derivatization methods and analytic methods can be adapted better to suit the respective groups of substances. Thus, in particular fractions which predominantly comprise triglycerides are transesterified prior to analysis, for example to give methyl esters. Solid-phase extraction is particularly suitable for automation.

In a further embodiment, the process according to the invention thus comprises one or more steps for derivatizing, chromatographing and/or analyzing the constituents, for example from the extracts obtained, or the phases. The extracts or the phases are preferably derivatized, chromatographed and analyzed in the following steps of the process according to the invention. To analyze the extracts further, certain constituents must be derivatized, depending on the separation and analytical methods used. Thus, derivatization is preferred for gas-chromatographic separation (GC), while derivatization is, as a rule, not necessary for separation by liquid chromatography (LC). If appropriate, an analytical method which does not involve chromatographic separation is also possible for example mass spectrometry (MS), atomic absorption spectrometry (AAS) or nuclear resonance spectrometry (NMR).

In a further preferred embodiment, the extraction process according to the invention additionally comprises at least one of the following further steps:

i) freezing the material, preferably rapid freezing of the material obtained, for example the harvested material;
ii) freeze-drying of the material;
iii) homogenizing and dispersing the material;
iv) evaporating an extract or a phase to dryness, in particular the polar and the unpolar phase, in particular following phase separation and/or transesterification/esterification in the phase;
v) carrying out an esterification/transesterification in the unpolar phase;
vi) carrying out an oxime formation in the unpolar phase;
vii) carrying out an oxime formation in the polar phase;
viii) carrying out a trialkylsilylation in the unpolar phase; and/or
ix) carrying out a trialkylsilylation in the polar phase.

The process according to the invention advantageously contains the individual abovementioned steps, more preferably more than one of the abovementioned steps, and most preferably all of the abovementioned steps, with the approximate sequence stated hereinabove or hereinbelow being especially preferred.

In accordance with the invention, it should be avoided that enzymatic processes which alter the constituent spectrum take place in the samples up to extraction.

After harvesting, the material is therefore advantageously cooled instantly, better frozen instantly, to prevent any enzymatic activity in the sample or in the material in this manner and thus to avoid an altered distribution of the constituents. Preferably, freezing of the material after obtaining or harvesting it is carried out in less than 60 s, with 30 s being more preferred and 15 s or less being most preferred. If the material takes the form of plant material, sampling can be effected directly in the phytotrone chambers. After obtaining the material, the latter is advantageously weighed rapidly and then frozen rapidly at a low temperature, for example in liquid nitrogen, and stored for example at −80° C. or in liquid nitrogen.

Freeze-drying of the material is also advantageous. Freeze-drying removes the water from the material so that enzymatic processes are inhibited. Using freeze-drying is particularly advantageous since the samples treated thus can be stored and processed at room temperature.

In one embodiment of the invention, the extraction, for example the extraction of the freeze-dried or frozen samples, is aided by further steps, e.g. by homogenization and dispersion techniques (Fiehn, Anal. Chem. 2000 and Nature Biotechnology 2000, Sauter, 1991, Roessner, 2000, Bligh and Dyer, 1959, Strand, 1999 and the like).

Thus, the material can be disrupted by high temperatures, vibrating mill or other grinding methods, pressure or rapid successive pressure changes, ultrasonic, shock-wave, microwave and/or Ultraturrax extraction steps and the constituents extracted better. An extraction method which allows the process to be automated is advantageous. Thus, for example, an ASE (accelerated solvent extraction), a PSE (pressurized solvent extraction), a PFE (pressurized fluid extraction) or a PLE (pressurized liquid extraction) can be carried out particularly advantageously, where the solvent or solvent mixture is forced through the material under pressure and, if appropriate, at elevated temperature (see Björklund, Trends in Analytical Chemistry 2000, 19 (7), 434-445, Richter, American Laboratory 1995, 27, 24-28, Ezzell, LC-GC 1995, 13 (5), 390-398). According to the invention, the extraction is carried out in such a way that the temperature and the pressure are adapted such that the constituents are not decomposed and thus the extraction efficacy is good, for example at a temperature of 0° C. to 200° C., with 20° C. being advantageous or 40° C. to 150° C. being more preferred, 120° C. or less are more preferred. Preferably, the process is carried out at 40 bar to 200 bar, more preferably at 70 bar, even more preferably at 100 bar to 170 bar. Thus, especially preferred conditions are a temperature of from 60° C. to 80° C., in particular 70° C., and from 110 bar to 150 bar, in particular 140 bar. The extraction time can be between 30 s and 20 min, with 10 min being preferred and 5 min or less being more preferred. Especially preferred is the use of a temperature of from 60° C. to 80° C. and a pressure of from 110 to 150 bar at an extraction time of less than 5 min. Thus, in accordance with the invention, the extraction conditions are milder than described in the prior art and lead to higher yields and a higher stability of the constituents which are isolated.

In accordance with the invention, work-up of the extracts can be interrupted at any point of the process described herein between the abovementioned steps as long as the extracts are stored or preserved stably, for example by freezing them at low temperatures and/or freeze-drying them. However, it is preferred to avoid interrupting the work-up prior to analysis.

After the extraction, the phases can be divided into various aliquots and, if appropriate, evaporated, for example to remove volatile acids and water and/or to prepare the samples for the following process steps, for example with an IR Dancer (shake device under reduced pressure, heated by infrared radiation), a vacuum centrifuge, or by freeze-drying. Evaporation should be carried out under mild conditions, preferably from 10° C. to 80° C., more preferably from 20° C. to 40° C., preferably under reduced pressure, for example from 100 mbar to 10 mbar, preferably at 10 mbar, depending on the solvent or solvent mixture. When using dichloromethane/methanol and/or methanol/water mixtures, it is especially preferred to reduce the pressure stepwise down to 10 mbar.

The process according to the invention also encompasses steps for separation and analysis, it being possible for the phases to be separated in each case via LC, GC and/or CE (capillary electrophoresis). After GC, the constituents can be detected for example by EI-MS (electron-impact ionization and analysis by mass spectrometer) or CI-MS (chemical ionization and analysis by means of mass spectrometer), sector-field mass spectrometer, quadrupole mass spectrometry, time-of-flight mass spectrometry, ion-trap mass spectrometry or Fourier transform ion cyclotron resonance mass spectrometry, FID (flame ionization detector) or Fourier transform infrared spectroscopy, and after LC for example by means of sector-field mass spectrometry, quadrupole mass spectrometry, time-of-flight mass spectrometry, ion-trap mass spectrometry or Fourier transform ion cyclotron resonance mass spectrometry, UV/Vis absorption detection, fluorescence detection, NMR or infrared spectroscopy. The process according to the invention preferably comprises an MS (mass spectrometry) analysis, an LC/MS (liquid chromatography coupled to any mass spectrometric detection) analysis, GC/MS (gas chromatography coupled to any mass spectrometric detection) analysis and/or LC/MS/MS analysis (liquid chromatography coupled to any tandem mass spectrometric detection), most preferably an LC/MS analysis, CC/MS analysis and/or LC/MS/MS analysis.

After the abovementioned evaporation, the extracts prepared in accordance with the invention can be taken up in HPLC solvents or HPLC solvent mixtures and then analyzed by LC. Suitable mobile phases are mixtures of, for example, methanol, acetonitrile or ethanol and/or tert-butyl methyl ether, tetrahydrofuran, isopropanol or acetone and/or water and/or a salt such as, for example, ammonium formate solution, ammonium carbonate solution, ammonium chloride solution, ammonium acetate solution, or ammonium hydrogen carbonate solution, or an acid such as formic acid, acetic acid, trifluoroacetic acid, pentafluoropropanoic acid, heptafluorobutanoic acid, nonafluoropentanoic acid, undecafluorohexanoic acid, tridecafluoroheptanoic acid or pentadecafluorooctanoic acid, or a base such as, for example, triethylamine, pyridine or ammonia, depending on whether polar or unpolar extracts from step (a) or (b) are to be separated. As a rule, a gradient elution is carried out, preferably followed by mass-spectrometric detection, for example MS or MS/MS detection (simple or tandem mass-spectrometric detection).

To carry out the GC analysis, a transesterification/esterification, in particular with methanol or ethanol, followed by an oxime formation, preferably a methoximation, can be carried out with the unpolar phase and/or the polar phase, as described below. Preferably, standard substances, for example chromatography and/or internal standards, can be added to each sample or to the respective extract, for example a solution of odd-numbered, straight-chain fatty acids or hydrocarbons. The extracts are subsequently trialkylsilylated, oximation and/or trialkylsilylation of the unpolar phase being optional.

These steps can be carried out as described herein, but can also be combined individually with other steps, for example other separation and analytical methods, as described above, and adapted to suit these methods.

In one embodiment in the process according to the invention, an esterification/transesterification is thus carried out in the polar and/or the unpolar phase of the extraction. The esterification/transesterification is preferably only carried out in the unpolar phase. Preferably, the esterification/transesterification according to the invention of the constituents or some of the constituents which have been extracted is carried out with an unsaturated or saturated straight-chain, branched-chain or cyclic alkyl alcohol having 1 to 8 carbon atoms, for example methanol, ethanol, 1-propanol, 2-propanol, butanol, pentanol, hexanol and the like. Methanol or ethanol are preferred, methanol being most preferred. The reaction temperature is preferably between 70 and 150° C., more preferably between 90 and 120° C., with 100° C. being most preferred. The reaction time is preferably between 0.5 h and 4 h, more preferably between 1 h and 3 h. Further solvents which are inert during the reaction may be present, for example toluene, dichloromethane, benzene and/or chloroform. Mixtures of the alcohols and/or inert solvents may also be used. However, the solution may also comprise 20% by volume or less of water, preferably 10% by volume, with 5% by volume or less being more preferred.

The amount of other solvents apart from the alcohol mentioned is preferably 20% by volume to 0% by volume and as low as possible.

In a preferred embodiment, the esterification/transesterification in the polar and/or unpolar phase is carried out with a volatile acid as catalyst, preferably with HF, HI, HCl, $BF_3$, $BCl_3$, HBr, formic acid, acetic acid, trifluoroacetic acid or trichloroacetic acid, with $BF_3$, $BCl_3$ or HCl being more preferred and HCl being most preferred.

A "volatile acid" is understood as meaning an acid which can essentially be removed by evaporation, preferably all of the acid can be removed by evaporation.

The use of a volatile, preferably readily volatile, acid such as, for example, HCl is a further considerable advantage of the process according to the invention. Especially preferably, the acid has a lower vapor pressure than the solvent used or the components of the solvent mixture or a possible azeotrope of all or some of the components including the acid itself. In contrast to the process described in the prior art, the use of volatile acids allows the acid residues to be removed rapidly by evaporation, which can be automated, while in the prior art the acid residues must be removed by washing steps followed by drying, for example using a desiccant such as sodium sulfate, and filtration. The process according to the invention is thus considerably better suited to high-throughput analysis. The solvent which can be employed for the esterification/transesterification can be an alkyl alcohol with an alkyl radical having 1 to 8 carbon atoms, as described above, optionally with a content of an inert solvent or solvent mixture, for example chloroform, dichloromethane, benzene and/or toluene. A mixture of chloroform, methanol, toluene and hydrochloric acid is especially preferred.

Following the esterification/transesterification, the solvent can be evaporated, preferably to dryness, in order to remove the acid, for example to remove volatile acids and water and to prepare the samples for the following process steps, for example using IR Dancer, vacuum centrifuge or by freeze-drying. Evaporation should be carried out under mild conditions, preferably at below 80° C., more preferably at below 40° C., preferably under reduced pressure, for example at 10 mbar, depending on the solvent or solvent mixture. It is especially preferred to reduce the pressure stepwise to, for example, 10 mbar using dichloromethane/methanol and/or methanol/water mixtures. The solvent or solvent mixtures employed can aid the drying step, for example by being particularly readily volatile or, as entrainants, by aiding the evaporation of water, as is the case with, for example, toluene.

In a further preferred embodiment, an oxime formation in the unpolar and/or polar phase is carried out in the process according to the invention. In accordance with the invention, an oxime is understood as meaning a compound of the structure (I) R—ONR'

(I)

where R can be H or an alkyl radical, preferably an alkyl radical having 1 to 6 carbon atoms, in particular a methyl, ethyl, propyl, butyl, pentyl or hexyl radical, or a substituted or unsubstituted arylalkyl radical, preferably with 5 to 7 carbon atoms in the arylalkyl radical and with 0 to 2 hetero atoms in the ring or in the chain of the arylalkyl radical, for example a substituted or unsubstituted benzyl radical, in particular a halogenated benzyl radical with 1 to 7 halogen radicals, preferably a pentafluorobenzyl radical, it being possible for R' to be any divalent radical. In accordance with the invention, reactants which can be used for oxime formation are compounds of the structure (Ib) R—$ONH_2$, where R is as defined above, preferably hydroxylamine or O-substituted hydroxylamines or in each case their salt with a volatile acid, for example hydrochlorides, such as O-alkylhydroxylamine hydrochloride or O-pentafluorobenzylhydroxylamine-hydrochloride, by processes known to the skilled worker (see also Fiehn, Anal. Chem. 2000), for example dissolved in a suitable solvent mixture or solvent, such as, for example, pyridine. Preferred is a process according to the invention wherein O-methylhydroxylamine-hydrochloride (II), O-pentafluorobenzylhydroxylamine-hydrochloride (III) or O-ethylhydroxylamine-hydrochloride (IV) is employed for the oxime formation, with O-methylhydroxylamine-hydrochloride (II) being most preferred.

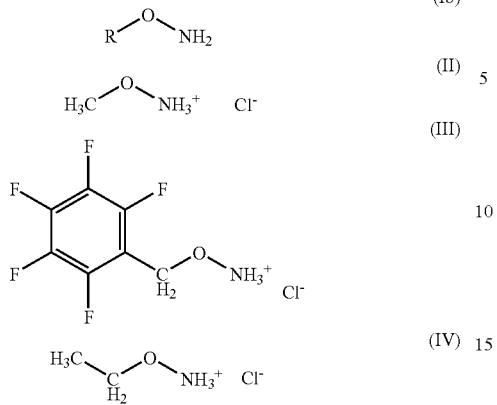

(Ib)
(II)
(III)
(IV)

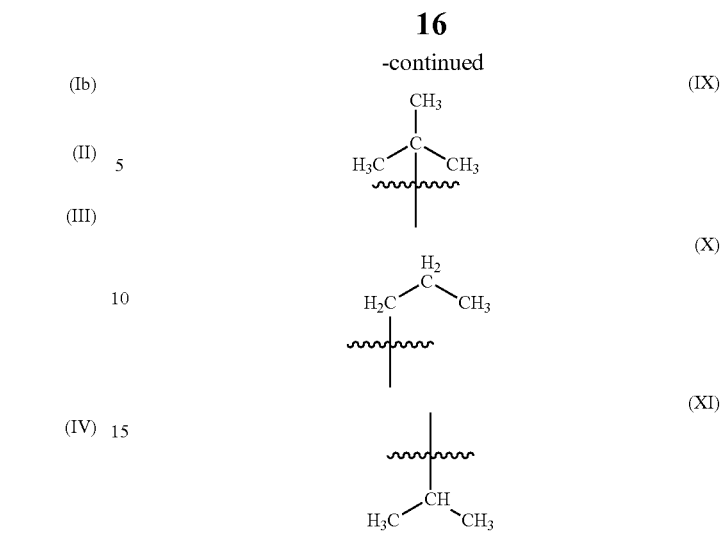

(IX)
(X)
(XI)

The reaction can be carried out for 30 min to 6 h, preferably for 1 h to 2 h, preferably at from at least 20° C. to 80° C., more preferably at from 50° C. to 60° C. It is especially preferred to carry out the reaction for 1 h to 2 h at from 50° C. to 60° C.

In a further embodiment according to the invention, a trialkylsilylation is carried out in the polar and/or unpolar phase. The trialkylsilylation can be carried out in accordance with the invention with a compound of the formula $Si(R^{1-4})_4$, $R^4$ preferably being an N—$C_{1-4}$-alkyl-2,2,2-trifluoroacetamide, especially preferably an N-methyl-2,2,2-trifluoroacetamide, as in formula (V). Especially preferred is thus the trialkylsilylation with a compound of the formula (V)

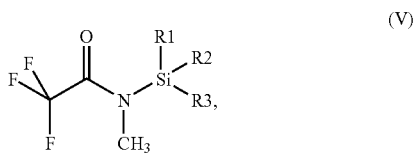

(V)

where $R^1$, $R^2$ and/or $R^3$ independently of one another can be alkyl radicals with in each case 1 to 6 carbon atoms, in particular $CH_3$, $C_2H_5$, $C_3H_7$ or $C_4H_9$ with the following structural formulae for $C_3H_7$ and $C_4H_9$:

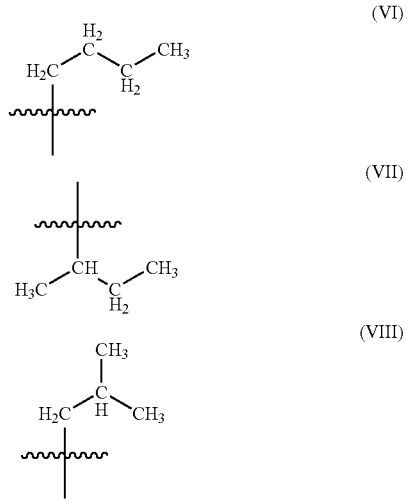

(VI)
(VII)
(VIII)

$R^1$ or $R^2$ are preferably methyl radicals, $R^1$ and $R^2$ are especially preferably methyl radicals. $R^3$ is preferably a straight-chain or branched alkyl radical having 1 to 4 carbon atoms as described above, especially preferably a methyl radical or tert-butyl radical, with $R^3$ more preferably being a methyl radical. A trimethylsilylation is preferably carried out with MSTFA (N-methyl-N-(trimethylsilyl)-2,2,2-trifluoroacetamide). The reaction can be carried out for 10 min to 120 min, preferably for 20 min to 60 min, at from 20° C. to 90° C., preferably at between 40° C. and 70° C.

Before the trialkylsilylation, preferably one or more internal standard(s) and/or chromatographic standard(s) may be added.

In an especially preferred embodiment, the material consists of plant material. Most of the prior art only describes the analysis starting from fluids, but not from solid material. The processing of plant cells differs from that of animal cells or tissues in as far as animal cells only have a cell membrane, but plant cells are surrounded by a cell wall. For example, plant populations or plant species, for example genetically modified or stressed plants, can be extracted. Also, homogenates can be prepared from a large number of organisms. To verify sensitivity, accuracy, precision, variability and reproducibility, standard solutions, or material mixed with standard solutions, can be assayed in the process. To this end, the organic material can be supplemented for example with defined amounts of standard substances.

In a likewise preferred embodiment, the process according to the invention is optimized for high throughput, low variability and high reproducibility and forms part of a high-throughput analysis.

A process optimized for high-throughput analysis preferably comprises one or more of the following further steps:
(i) harvesting/obtaining the organic material;
(ii) freeze-drying the material;
(iii) using extraction mixtures in step (a) and (b) which, when combined, form one phase, preferably using 80% by volume of methanol and 20% by volume of water in step (a) and 40% by volume of methanol and 60% by volume of dichloromethane in step (b);
(iv) following phase separation and esterification/transesterification, evaporating the extracts;
(v) carrying out an esterification/transesterification in the unpolar phases using a volatile acid, preferably HCl; or
(vi) analyzing the extracts by MS, LC/MS, LC/MS/MS and/or GC/MS analysis.

These process steps are optimized for high throughput and the use of robots, and manual labor is therefore reduced by at least 10%, preferably 20%, more preferably by more than 30%, most preferably by at least 50%, over the prior art.

Advantageously, the sample mix-up rate is reduced by more than 10%, more preferably by more than 20%, even more preferably by more than 30%, most preferably by more than 50% by the process according to the invention and its possibility of using automation and robotics. Likewise, a considerably increased reproducibility in a high-throughput analysis is achieved by the process steps according to the invention. The increased reproducibility of the process according to the invention is characterized by an analytical variability which is at least 10%, preferably 20%, more preferably at least 30%, most preferably at least 50% less than in the prior art.

The processes described in the prior art are not suitable for a high-throughput extraction of metabolites from organic material, or are suitable to a limited extent only. Known diagnostic extractions relate mainly to analyses of fluids, for example urine, so that these processes are not suitable for working up solid samples, in particular plant cell samples.

The processes described in the prior art require the freezing and mechanical pulverization of the frozen samples, the separation of the organic phase from the aqueous phase when preparing total extracts which encompass both the lipophilic and the polar metabolites, and comprehensive wash steps of an organic phase with an aqueous solution for removing the acid, followed by laborious removal of water from the organic solvent and, if appropriate, filtration of the sample material; steps which are time-consuming and can only be automated with a high degree of technical complexity, if at all (Fiehn, Anal. Chem. 2000 and Nature Biotechnology 2000). Only the process according to the invention discloses the essential process steps which permit effective and comprehensive automation in connection with an acceleration of the process.

Especially preferred is, accordingly, a process according to the invention comprising step (iii), more preferably being a process comprising steps (ii) and (iii), even more preferably (ii), (iii) and (iv), even more preferably (ii), (iii), (iv) and (v). Most preferred is a process comprising all of the steps (i) to (vi). Especially preferred is a process wherein the organic material is extracted by an ASE. If appropriate, the extracts can be fractionated further via solid-phase extraction.

In a further embodiment, the process forms part of a process for analyzing a metabolic profile, advantageously in the form of a high-throughput process, and encompasses the abovementioned process steps and the following further step: analysis of the resulting data by automatic peak recognition and peak integration.

Thus, the process according to the invention can be used, for example, to study
a) effects of genetic differences on the metabolic profile,
b) the effect of, for example, environmental conditions, stress, chemical substances and the like,
c) the interaction between a) and b) or
d) the course over time of a), b) or c),
as is the case for example in studies into the effect of one or more substances (including, for example, substance libraries) on the metabolic profile of, for example, organisms which are as genetically identical as possible, organisms which are genetically related, down to organisms which are as genetically different as possible.

The present invention is illustrated by the examples which follow, without this implying any limitation whatsoever.

EXAMPLE 1

Sampling and Sample Storage

Sampling takes place directly in the phytotrone chamber. The plants were cut off using small laboratory scissors, weighed rapidly on a laboratory scale, transferred into a pre-cooled extraction thimble and placed into an aluminum rack cooled by liquid nitrogen. If required, the extraction thimbles can be stored in the freezer at $-80°$ C. The time between cutting off the plant and freezing the plant in liquid nitrogen does not exceed 10-20 sec.

EXAMPLE 2

Freeze-Drying

Care was taken that, during the experiment, the plants either remained in the sub-zero state (temperatures $<-40°$ C.) or were freed from water by freeze-drying before they came into the first contact with solvents.

The aluminum rack with the plant samples in the extraction thimbles was placed into the pre-cooled ($-40°$ C.) freeze-drier. The initial temperature during the main drying step was $-35°$ C., and the pressure was 0.120 mbar. During drying, the parameters were altered following a pressure and temperature program. The final temperature after 12 hours was $+30°$ C., and the final pressure was at 0.001 to 0.004 mbar. After the vacuum pump and the refrigerating installation had been switched off, the system was ventilated with air (dried by means of a drying tube) or with argon.

EXAMPLE 3

Extraction

Immediately after the freeze drier was ventilated, the extraction thimbles with the freeze-dried plant material were transferred into the 5 mL ASE extraction cartridges.

The 24 sample positions of an ASE apparatus (Accelerated Solvent Extractor ASE 200 with Solvent Controller and AutoASE software (DIONEX)) are filled with plant samples.

The polar substances were extracted with approx. 10 mL methanol/water (80/20, v/v) at T=$70°$ C. and p=140 bar, 5 min heating phase, 1 min static extraction. The more lipophilic substances were extracted with approx. 10 mL of methanol/dichloromethane (40/60, v/v) at T=$70°$ C. and p=140 bar, 5 min heating phase, 1 min static extraction. The two solvent mixtures are extracted into the same sample tube (centrifuge tubes, 50 mL, with screw top and pierceable septum for the ASE (DIONEX)).

Internal standards were added to the solution: ribitol, L-glycine-2,2-$d_2$, L-alanine-2,3,3,3-$d_4$ and $\alpha$-methylglucopyranoside, and methyl nonadecanoate, methyl undecanoate, methyl tridecanoate and methyl nonacosanoate.

7 mL of water were added to the total extract. The solid residue of the plant sample and the extraction thimble were discarded.

The extract was shaken and then centrifuged for 5 to 10 min at least 1400 g in order to accelerate phase separation. 1 mL of the supernatant methanol/water phase ("polar phase", colorless) was removed for the subsequent GC analysis, and 1 mL was removed for the LC analysis. The remainder of the methanol/water phase was discarded. The organic phase was again washed with the same volume of water (7 mL) and centrifuged. 0.5 mL of the organic phase ("lipid phase", dark green) was removed for the subsequent GC analysis, and 0.5 mL was removed for the LC analysis. All of the aliquots removed were evaporated to dryness using the IR-Dancer infrared vacuum evaporator (Hettich). The maximum temperature during the evaporation process did not exceed 40° C. The pressure within the apparatus was not less than 10 mbar.

EXAMPLE 4

Processing the Lipid Phase for the LC/MS or LC/MS/MS Analysis

The lipid extract which had been evaporated to dryness was taken up in eluent. The HPLC run was carried out with gradient elution.

EXAMPLE 5

Processing the Polar Phase for the LC/MS or LC/MS/MS Analysis

The polar extract which had been evaporated to dryness was taken up in eluent. The HPLC run was carried out with gradient elution.

EXAMPLE 6

Derivatization of the Lipid Phase for the GC/MS Analysis

To carry out the transmethanolysis, a mixture of 140 ml of chloroform, 37 ml of hydrochloric acid (37% by weight of HCl in water), 320 ml of methanol and 20 ml of toluene was added to the evaporated extract. The container was sealed and heated for 2 hours at 100° C., with shaking. The solution was subsequently evaporated to dryness. The residue was dried completely.

Methoximation of the carbonyl groups was effected by reaction with methoxyamine hydrochloride (5 mg/mL in pyridine, 100 ml) for 1.5 hours at 60° C. in a sealed vessel. 20 ml of a solution of odd-numbered, straight-chain fatty acids were added as time standards. Finally, a derivatization was carried out with 100 ml of N-methyl-N-(trimethylsilyl)-2,2, 2-trifluoroacetamide (MSTFA) for 30 minutes at 60° C., again in a sealed vessel. The end volume prior to GC injection was 200 ml.

EXAMPLE 7

Derivatization of the Polar Phase for the GC/MS Analysis

The methoximation and trimethylsilylation with MSTFA were carried out as described for the lipid phase.

We claim:

1. A process for extracting one or more metabolites from an organic material, comprising
    (1) an extraction step, comprising
        (a) extracting an organic material with a first extraction and a second extraction, wherein
            (i) the first extraction comprises extracting with a monophasic mixture of 50% by volume to 90% by volume of methanol and 50% by volume to 10% by volume of water and, optionally, 0% by volume to 40% by volume of a further solvent or solvent mixture; and
            (ii) the second extraction comprises extracting with a monophasic unpolar solvent or solvent mixture, and
        (b) combining the extracts obtained from step (i) and step (ii) to form one phase; and
    (2) an analyzing step, in which one or more metabolites are determined;
    wherein in step (a), the first extraction and the second extraction are prepared in parallel or in succession.

2. The process of claim 1, wherein step (i) is carried out with a mixture of 80% by volume of methanol and 20% by volume of water.

3. The process of claim 1, wherein step (ii) is carried out with a mixture of 30% by volume to 60% by volume of $C_1$- to $C_6$-alkyl alcohol, acetone, acetonitrile, ethyl acetate, dimethyl sulfoxide or N,N-dimethylformamide and 40% by volume to 70% by volume of chloroform, dichloromethane, pentane, hexane, heptane, cyclohexane or carbon tetrachloride.

4. The process of claim 1, wherein step (ii) is carried out with a mixture of 30% by volume to 70% by volume of methanol and 40% by volume to 60% by volume of dichloromethane.

5. The process of claim 1, wherein, in one or more further steps, the one or more metabolites are derivatized, chromatographed and/or analyzed.

6. The process of claim 1, wherein the process comprises at least one of the following further steps:
    i) freezing the organic material;
    ii) freeze-drying the organic material;
    iii) homogenizing and/or dispersing the organic material;
    iv) evaporating the extract or the phase to dryness;
    v) carrying out an esterification/transesterification in the unpolar phase;
    vi) carrying out an oxime formation in the unpolar phase;
    vii) carrying out an oxime formation in the polar phase;
    viii) carrying out, in the unpolar phase, a trialkylsilylation where each alkyl radical contains 1 to 6 carbon atoms; or
    ix) carrying out, in the polar phase, a trialkylsilylation where each alkyl radical contains 1 to 6 carbon atoms.

7. The process of claim 6, wherein the esterification/transesterification is carried out with a volatile acid as catalyst.

8. The process of claim 6, wherein the phase is analyzed via LC, GC, MS, LC/MS, GC/MS, and/or LC/MS/MS analysis.

9. The process of claim 1, wherein extracting is carried out at a temperature of from 0° C. to 200° C. and at a pressure of from 40 bar to 200 bar.

10. The process of claim 1, wherein the solvent or solvent mixture used for the first extraction and/or the solvent or solvent mixture used for the second extraction additionally comprise up to 5% by weight of buffer salts, acids and/or bases.

11. The process of claim 1, wherein the phase is analyzed via LC, GC, MS, LC/MS, GC/MS, and/or LC/MS/MS analysis.

12. The process of claim 1, wherein the organic material is composed of plant material.

13. The process of claim 1, wherein the process is part of a process for analyzing a metabolic profile and comprises the following further step:
    analyzing the resulting data by automatic peak recognition and peak integration.

14. The process of claim 1, wherein the first extraction and the second extraction of step (a) are carried out in parallel by dividing the organic material and carrying out the first extraction and the second extraction separately.

15. The process of claim 1, wherein the first extraction and the second extraction of step (a) are carried out in succession, wherein the first extraction of step (i) is carried out followed by the second extraction of step (ii), or the second extraction of step (ii) is carried out followed by the first extraction of step (i).

16. The process of claim 1, wherein step (i) is carried with a monophasic mixture comprising 40% by volume to 15% by volume of water.

17. The process of claim 1, wherein step (i) comprises plural extraction steps.

* * * * *